Patented Sept. 23, 1952

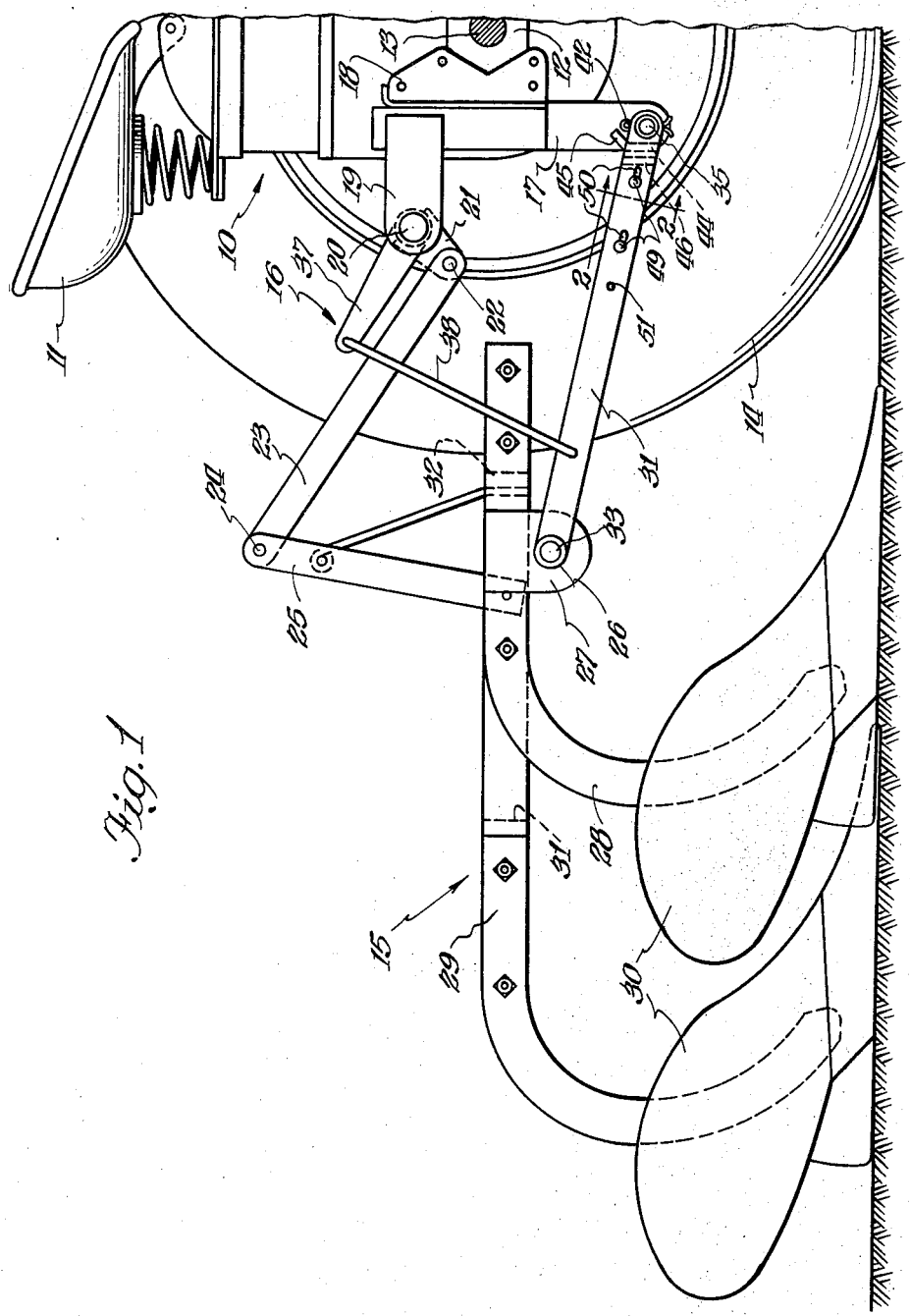

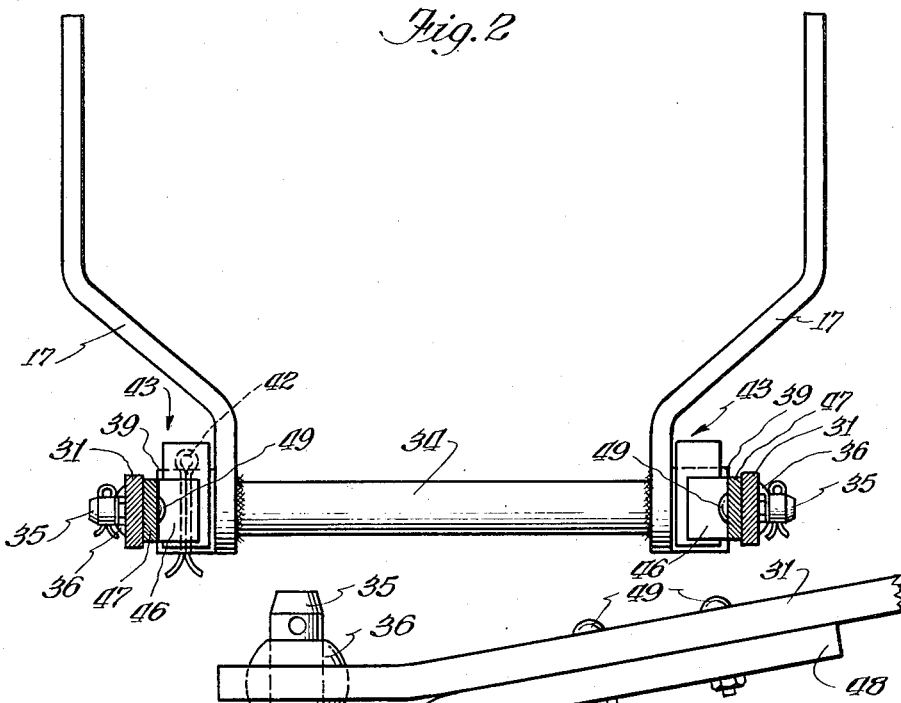
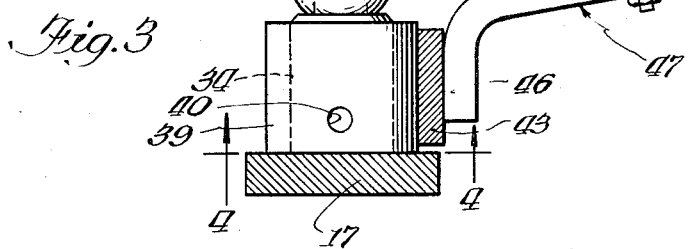
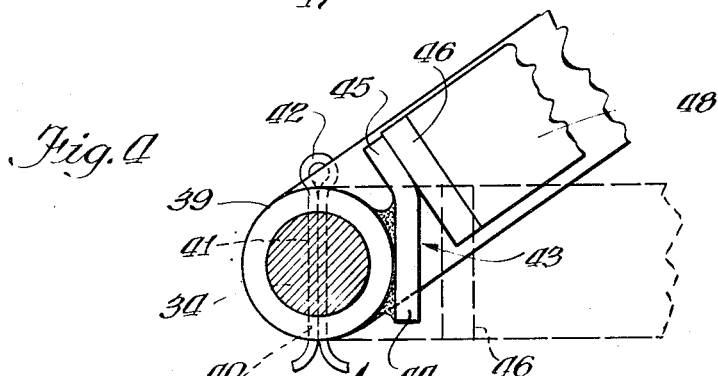

2,611,304

UNITED STATES PATENT OFFICE 2,611,304

TRACTOR-MOUNTED IMPLEMENT

Wayne G. Toland, Canton, Ill., assignor to International Harvester Company, a corporation of New Jersey Application November 18, 1950, Serial No. 196,473

9 Claims. (Cl. 97—47)

This invention relates to agricultural implements and particularly to a tractor mounted implement. More specifically, the invention concerns a novel hitch mechanism for connecting an implement to a tractor to be carried thereon in transport.

The invention was designed specifically for use with a universal attaching framework by which one or more types of implements, such as a plow or middle buster or the like, may be mounted upon the tractor. The implement with which the present invention is concerned is closely coupled to the tractor for ease of control, and for ease in transporting the implement when not in use and when turning as at the end of a field. Where such an implement is mounted at the rear of a tractor, space is at a premium. In the case of a direct connected plow, it is desirable that the implement be allowed to swing laterally to opposite sides of a center line in order that the implement may follow more easily in the path of the tractor. It is also important that when the plow is raised to its transport position on the tractor it be held substantially rigidly in place and not be allowed to swing from side to side where it might endanger the tractor parts or even the operator. In the case of an implement such as a middle buster, it is desirable that it be maintained in a centered position with respect to the tractor during operation and not be allowed to swing from side to side. It is customary to utilize bulky chains, rods and the like to limit the lateral swinging of a plow and to hold the plow centered in transport position. One of the objects of this invention therefore is to provide a universal attaching means for mounting implements of different types upon a tractor and simplified but highly efficient means for controlling the movement of the plow in operating and transport positions.

Another object of the invention is to provide in an attaching framework of the universal type for mounting an implement upon a tractor, simple and efficient means accommodating lateral swinging of a plow in operating position while holding it rigid in transport position, which means is optionally adjustable for use when another type of implement is mounted upon the universal carriage.

Other objects and advantages of the invention will become apparent after a consideration of the following detailed description in conjunction with the accompanying drawings, wherein:

Fig. 1 is a view in side elevation of the rear end of a tractor with one drive wheel removed showing an implement and attaching structure embodying the features of the present invention attached thereto.

Fig. 2 is a view in end elevation, partly in section, of a portion of the universal attaching frame by which the implement is mounted upon the tractor.

Fig. 3 is a plan view enlarged, partly in section of a portion of one side of the implement attaching frame showing the manner in which the connecting links are attached to the tractor and with the parts in position for use with an implement such as a middle buster.

Fig. 4 is an enlarged detail in side elevation on the line 4—4 of Fig. 3, with the hitch structure adjusted for a plow.

In reference to the drawings and particularly Fig. 1, the body of the tractor upon which the implement of this invention is mounted is designated by the numeral 10. The tractor is provided with an operator's seat 11, a rear axle housing 12 extending laterally from each side of the body 10 and journalling a rear axle 13 upon which is mounted a pair of spaced drive wheels 14, only one of which is shown.

The implement described herein and shown in the drawings is a two-bottom moldboard plow indicated by the numeral 15 and is connected to the tractor to be carried thereon in transport by a universal attaching frame 16 comprising a pair of generally vertically extending angled straps 17, one at each side of the tractor body and affixed to brackets 18 one of which is also provided at each side of the tractor body and mounted upon the rear axle housing 12. The upper end of each of the straps 17 has secured thereto and extending rearwardly therefrom a lug 19. Between the rear ends of the lugs 19 is mounted a transversely extending shaft member 20. This shaft has secured thereto and centrally thereof one or more lugs 21 which extend downwardly and rearwardly and support a pin 22 to which is pivotally connected the forward end of a link 23. The rear end of link 23 is pivotally mounted upon a pin 24 carried at the upper end of a vertically extending standard 25 which is preferably bifurcated at its lower end and affixed at laterally spaced locations to the plow frame. A transversely extending bar 26 is supported in one or more brackets 27 carried by tool beams 28 and 29. Tool beams 28 and 29 are the longitudinally extending beams of the plow 15 which support at their curved rear ends moldboard plow bottoms 30. The plow beams are connected by cross braces 31 and 32.

The outer ends of the transverse bar 26 serve for the pivotal connection thereto of the rear ends of a pair of laterally spaced forwardly converging links 31. These links are connected to the ends of the bar 26 by knuckles 33 to provide generally universal pivotal movement of the link relative thereto. The forward end of each of the links 31 is pivotally mounted upon the respective ends of a transverse bar 34 mounted between the lower ends of the straps 17 and having a reduced portion 35 at each end thereof. The forward end of each link 31 is mounted upon the reduced portion 35 of the bar 34 by means of a knuckle 36 to provide generally universal pivotal action of the forward end of the link.

The links 23 and 31 form a triangular generally parallel link arrangement by which the implement is connected to the tractor and which permits the implement to be raised and lowered in a generally straight line. Lifting of the implement is accomplished by rocking the shaft 20 which has affixed thereto a rearwardly extending lift arm 37, one of which is provided at each end of the shaft 20 and which are connected to the respective links 31 by lift rods 38, only one of which is visible in the drawings.

As pointed out before, with a plow such as shown in the drawings it is desirable that it be allowed to swing laterally within certain limits to permit it to follow in the path of a tractor and operate satisfactorily, although it must be held rigid in transport position to avoid damages that might result from its bouncing around in transport.

Applicant has provided novel means for limiting the lateral swinging of the implement while holding it rigid when it is raised to transport position. This mechanism comprises a sleeve 39 mounted upon each end of the bar 34 projecting beyond the strap 17. Since these sleeves and the mechanism associated therewith and with the adjacent link 31 are substantial duplicates, the mechanism at only one end of the bar will be described. Sleeve 39 is loose upon the bar 34 for rotation thereon and is provided on opposite sides with apertures 40 adapted to register with an aperture 41 passing diametrically through the bar 34. Upon registration of these openings, a cotter key 42 may be passed therethrough to secure the sleeve to the transverse bar. In the case of the moldboard plow shown in the drawings, the cotter key 42 is in place to hold the sleeve 39 against rotation. Sleeve 39 has welded thereto on its rear face a stop plate 43 having a vertically extending portion 44 and an upper forwardly bent portion 45. This stop plate member is relatively broad and the vertical portion thereof is parallel to the transversely angled plate portion 46 of an angle bar 47 having a longitudinally extending main body portion 48 which lies alongside the inner face of the associated link 31 near its forward end. The angle bar 47 is secured to the link 31 by a pair of bolts 49 receivable in slots 50 provided in the link 31 and in registering apertures formed in the angle bar 47. By loosening the bolts 49, therefore, the angle bar 47 with its laterally projecting plate portion 46 may be adjusted longitudinally so that the plate portion 46 may approach or be withdrawn from the vertical portion 44 of the stop member 43.

As shown in Fig. 1, with the moldboard plow of the present invention the angle bar 47 is adjusted so that the plate 46 is spaced rearwardly from its mating stop plate 43. Sufficient play is thus provided to accommodate lateral swinging of the plow in its operating position. Upon lateral swinging of the plow to one side or the other of a center line, its movement is about a center represented by the pivotal connection of the forward end of the link 31 to the bar 34, and the plate 46 will engage the stop plate 43 at the extremes of lateral swinging of the implement. The amount of play allowed the implement, of course, may be adjusted by adjusting the spacing between the stop plates. Upon raising the plow 15 to its transport position by rocking the shaft 20 and lift arm 37, the plate 46 of the angle bar 47 engages the curved extension 45 at the upper end of the stop 44, as shown in Fig. 4, the radial distance of this extension from the center of the member 35 being greater than the arc of travel of the plate 46.

When the universal hitch frame 16 is used for the connection to the tractor of a middle buster, the angle bar 47 is adjusted forwardly until the plate 46 engages its mating plate 44 as shown in Fig. 3. When this adjustment is made, it is clear, of course, that the implement and the universal frame 16 will be unable to partake of lateral swinging movement in its operating position and will be held in a centered position with respect to the tractor. Another aperture 51 is provided in the link 31 adapted to register with a similar aperture in the angle bar 47 when it has been moved to its farthest advanced position in engagement with the stop 43 so that a bolt may be passed therethrough to insure against movement of the bolts 49 in the slots 50. In this position, however, in order that the middle buster or other similar implement may be raised and lowered with respect to the tractor, the cotter pin 42 is removed to allow the sleeve 39 to freely rotate on the bar 34. Thus the middle buster unit may be raised and lowered and will be held against lateral swinging movement in both operating and transport positions.

It is believed that the operation of the hitch mechanism of the present invention will be clearly understood from the foregoing description. It may be also understood, however, that modifications may be made in the invention without departing from the spirit thereof or the scope of the appended claims.

What is claimed is:

1. Hitch means for a tractor-mounted implement having laterally spaced longitudinally extending hitch arms connecting the implement to the tractor, comprising transverse shaft means, universal connecting means connecting the forward end of each said hitch arm to the shaft means to accommodate lateral swinging of the implement relative to the tractor in operating position and vertical swinging thereof between operating and transport positions about the axis of said transverse shaft means, a part mounted on said shaft, a stop member affixed to said part, a plate member carried by the hitch arm spaced from said stop during normal operation of the implement but engageable therewith to limit the lateral swinging of the implement, said stop having a portion engageable with the plate member upon vertical swinging of the implement to transport position about the axis of said shaft to hold the implement against lateral swinging.

2. Hitch means for a tractor-mounted implement having laterally spaced longitudinally extending hitch arms connecting the implement to the tractor, comprising transverse shaft means, universal connecting means connecting the forward end of each said hitch arm to the shaft means to accommodate lateral swinging of the implement relative to the tractor in operating position and vertical swinging thereof between operating and transport positions about the axis of said transverse shaft means, a sleeve on said shaft for rotation thereon, a stop member affixed to said sleeve, a plate member carried by the hitch arm spaced from said stop during normal operation of the implement but engageable therewith to limit the lateral swinging of the implement, said stop having a portion engageable with the plate member upon vertical swinging of the implement to transport position about the axis of said shaft to hold the implement against lateral swinging, and means optionally operable for securing said sleeve to said shaft.

3. Hitch means for a tractor-mounted implement having laterally spaced longitudinally extending hitch arms connecting the implement to the tractor, comprising transverse shaft means, universal connecting means connecting the forward end of each said hitch arm to the shaft means to accommodate lateral swinging of the implement relative to the tractor in operating position and vertical swinging thereof between operating and transport positions about the axis of said transverse shaft means, a sleeve on said shaft for rotation thereon, a stop member affixed to said sleeve, a plate member carried by the hitch arm spaced from said stop during normal operation of the implement but engageable therewith to limit the lateral swinging of the implement, said stop having a portion engageable with the plate member upon vertical swinging of the implement to transport position about the axis of said shaft to hold the implement against lateral swinging, means optionally operable for securing said sleeve to said shaft, and means for adjusting said plate member to a position in engagement with said stop member in the normal operating position of the implement to prevent lateral swinging thereof.

4. Hitch means for a tractor-mounted implement having laterally spaced longitudinally extending hitch arms connecting the implement to the tractor, comprising transverse shaft means, universal connecting means connecting the forward end of each said hitch arm to the shaft means to accommodate lateral swinging of the implement relative to the tractor in operating position and vertical swinging thereof between operating and transport positions about the axis of said transverse shaft means, a sleeve on said shaft for rotation thereon, means for optionally securing said sleeve to the shaft, a stop member affixed to said sleeve, a plate member carried by the hitch arm adjacent said stop member, and means for adjusting said plate longitudinally between a position spaced from the stop member sufficiently to accommodate limited lateral play of the implement in the normal operation thereof and a position in engagement with the stop member to prevent lateral play of the implement in the normal operating position thereof.

5. Hitch means for a tractor-mounted implement having laterally spaced longitudinally extending hitch arms connecting the implement to the tractor, comprising transverse shaft means, universal connecting means connecting the forward end of each said hitch arm to the shaft means to accommodate lateral swinging of the implement relative to the tractor in operating position and vertical swinging thereof between operating and transport positions about the axis of said transverse shaft means, and adjustable means alternatively operable for holding the implement against lateral swinging in the normal operating position thereof, or for accommodating limited lateral swinging of the implement, comprising a sleeve on the shaft and means for releasably securing the sleeve to the shaft, stop means in the form of a flat plate affixed to the sleeve and a mating plate member carried by each hitch arm, said mating plate member being adjustable longitudinally from a position spaced from the stop means and engageable therewith upon lateral swinging of the implement, to a position in engagement with the stop plate to prevent lateral swinging of the implement.

6. Hitch means for a tractor-mounted implement having laterally spaced longitudinally extending hitch arms connecting the implement to the tractor, comprising transverse shaft means, universal connecting means connecting the forward end of each said hitch arm to the shaft means to accommodate lateral swinging of the implement relative to the tractor in operating position and vertical swinging thereof between operating and transport positions about the axis of said transverse shaft means, and adjustable means alternatively operable for holding the implement against lateral swinging in the normal operating position thereof or for accommodating limited lateral swinging of the implement, comprising a sleeve on the shaft and means for releasably securing the sleeve to the shaft, stop means in the form of a flat plate affixed to the sleeve, and a mating plate member carried by each hitch arm, said mating member being adjustable longitudinally from a position spaced from the stop means and engageable therewith upon lateral swinging of the implement, to a position in engagement with the stop plate to prevent lateral swinging of the implement, said sleeve being releasable for rotation on the shaft in the latter position of the stop and mating plates to accommodate vertical movement of the implement about the axis of the shaft means.

7. Hitch means for a tractor-mounted implement having laterally spaced links connecting the implement to the tractor, comprising a connector member on the tractor to which each said link is pivotally connected for lateral and vertical swinging of the implement relative to the tractor about the axis of said member, a flat stop member extending vertically in a transverse plane associated with said connector member and having a curved extension at its upper end, a vertically extending plate member seured to said link spaced from and generally parallel to said stop member in the operating position of the implement, said plate being arranged to engage the stop member upon lateral swinging of the implement and to engage the curved extension thereof upon vertical movement of the implement about the pivotal connection of the links to the connector member.

8. Hitch means for a tractor-mounted implement having laterally spaced longitudinally extending hitch links connecting the implement to the tractor, comprising transverse shaft means, universal connecting means connecting the forward end of each said hitch link to the shaft means to accommodate lateral shifting of the implement relative to the tractor in operating position and vertical swinging thereof between operating and transport positions about the axis of said transverse shaft means, means serving as a sleeve rotatable on said shaft, means for releasably securing said sleeve against rotation on the shaft, a flattened stop member extending vertically in a transverse plane secured to said sleeve and having a curved extension at its upper end, a vertically extending plate member secured to said link spaced from and generally parallel to said stop member in the operating position of the implement, said plate member being engageable with the extension on said stop member upon raising the implement to transport to hold the implement rigidly against swinging movement.

9. Hitch means for a tractor-mounted implement having laterally spaced longitudinally extending hitch links connecting the implement to the tractor, comprising transverse shaft means, universal connecting means connecting the forward end of each said hitch link to the shaft means to accommodate lateral shifting of the implement relative to the tractor in operating position and vertical swinging thereof between operating and transport positions about the axis of said transverse shaft means, means serving as a sleeve rotatable on said shaft, means for releasably securing said sleeve against rotation on the shaft, a flattened stop member extending vertically in a transverse plane secured to said sleeve and having a curved extension at its upper end, a vertically extending plate member secured to said link spaced from and generally parallel to said stop member in the operating position of the implement, said plate member being engageable with the extension on said stop member upon raising the implement to transport to hold the implement rigidly against swinging movement, and means for longitudinally adjusting said plate member on said link into engagement with said stop member in the operating position of the implement to prevent lateral swinging thereof during operation while accommodating vertical swinging about the axis of said shaft upon release of the means securing the sleeve to the shaft.

WAYNE G. TOLAND.

REFERENCES CITED

The following references are of record in the file of this patent:

UNITED STATES PATENTS

| Number | Name | Date |
|---|---|---|
| 2,440,422 | Westmoreland | Apr. 27, 1948 |
| 2,446,584 | Green | Aug. 10, 1948 |
| 2,531,768 | Cline et al. | Nov. 28, 1950 |
| 2,561,032 | Onfrey | July 17, 1951 |